(12) United States Patent
Levchenko

(10) Patent No.: US 9,031,831 B1
(45) Date of Patent: *May 12, 2015

(54) METHOD AND SYSTEM FOR LOOKING UP WORDS ON A DISPLAY SCREEN BY OCR COMPRISING A SET OF BASE FORMS OF RECOGNIZED INFLECTED WORDS

(75) Inventor: Dmitry Levchenko, Moscow region (RU)

(73) Assignee: ABBYY Development LLC (RU)

( * ) Notice: Subject to any disclaimer, the term of this patent is extended or adjusted under 35 U.S.C. 154(b) by 599 days.

This patent is subject to a terminal disclaimer.

(21) Appl. No.: 13/006,813

(22) Filed: Jan. 14, 2011

Related U.S. Application Data

(60) Provisional application No. 61/294,947, filed on Jan. 14, 2010.

(51) Int. Cl.
*G06F 17/27* (2006.01)
*G06K 9/34* (2006.01)
*G10L 15/26* (2006.01)

(52) U.S. Cl.
CPC .......... *G06F 17/2785* (2013.01); *G10L 15/265* (2013.01)

(58) Field of Classification Search
CPC ............ G06F 17/2785; G06K 2209/01; G10L 15/265

USPC .................................................. 704/2, 246, 3
See application file for complete search history.

(56) References Cited

U.S. PATENT DOCUMENTS

| | | | | |
|---|---|---|---|---|
| 5,349,368 A * | 9/1994 | Takeda et al. | ................. | 345/684 |
| 5,615,378 A * | 3/1997 | Nishino et al. | .................... | 704/4 |
| 6,792,409 B2 * | 9/2004 | Wutte | ......................... | 704/276 |
| 2002/0099542 A1 * | 7/2002 | Mitchell et al. | ............... | 704/231 |
| 2007/0230787 A1 * | 10/2007 | Belitskaya et al. | ........... | 382/182 |
| 2007/0239424 A1 * | 10/2007 | Payn | ................................. | 704/3 |
| 2009/0306980 A1 * | 12/2009 | Shin | ............................. | 704/235 |
| 2010/0008582 A1 * | 1/2010 | Kim et al. | .................... | 382/177 |

* cited by examiner

*Primary Examiner* — Farzad Kaseminezhad
(74) *Attorney, Agent, or Firm* — LeighAnn Weiland; Veronica Weinstein

(57) ABSTRACT

Embodiments of the present invention disclose a dictionary lookup method and an electronic device that implements the dictionary lookup method. The dictionary lookup method allows a user to quickly obtain meanings and translations of words from electronic dictionaries while reading a text on a display screen of the electronic device, wherein reading text is utilized by performing an optical character recognition comprising of determining a set of base forms of each inflected recognized word. Advantageously, in one embodiment the meanings (e.g., the base forms) and translations may be displayed in a balloon, in a pop-up window, as subscript, as superscript, or in any other suitable manner when the user touches a word on the display screen, in one embodiment.

27 Claims, 3 Drawing Sheets

METHOD AND SYSTEM FOR LOOKING UP WORDS ON A DISPLAY SCREEN BY OCR COMPRISING A SET OF BASE FORMS OF RECOGNIZED INFLECTED WORDS

This application claims the benefit of priority to U.S. 61/294,947 filed on Jan. 14, 2010, the entire specification of which is incorporated herein by reference.

FIELD

The present disclosure is directed towards looking up words on a display screen.

BACKGROUND

Unlike machine translation systems, electronic dictionaries are used to look up individual words and word combinations while reading printed texts or texts displayed on a computer screen. Users may interact with electronic dictionaries in different ways.

Also, there are a plethora of electronic devices with display screens capable of displaying text. These devices are suitable for using electronic dictionaries which may be installed locally, i.e. on the user's computer or portable device (such as smartphones, PDAs, cell phones, digital photo or video cameras, e-book readers, and other gadgets), on a local area network, or they may be available over the Internet.

Many of the aforesaid devices have advanced displays and associated logic capable of supporting non-keyboard type input methods. For example, the devices may support pen-based input, or touch-based input.

SUMMARY

The present invention relates to implementation of a method and a system for displaying meanings and translations of words and word combinations in electronic dictionaries by means of a touch screen, an interactive whiteboard or any other device which allows the user to interact with a computer by touching areas on the touch screen.

In one embodiment, the invention provides a method comprising: touching a touch screen of an electronic device with a finger, a stylus, or any other suitable object; establishing coordinates of the touch; and identifying a word or a word combination touched by the user; looking up the word or the word combination in a dictionary; displaying an abridged version of a relevant entry, for example, in a balloon or in a pop-up window on the screen of the electronic device.

In another embodiment, the invention provides a method comprising: touching a touch screen of an electronic device with a finger, a stylus, or any other suitable object; establishing coordinates of the touch; if the touch occurs on non-text area, identifying region in text area where a word or word combination may be located, separating the text from the background, and performing Optical Character Recognition (OCR) on an image of the word or word combination; looking up the word or word combination in an electronic dictionary; displaying an abridged version of a relevant entry in a balloon or in a pop-up window on the touch screen of the electronic device.

The electronic dictionaries may comprise a software program and dictionaries. The software program may include a shell, which provides a graphical user interface, morphology models to display inflected forms, context search that uses an index, a teaching module, etc. The dictionaries that the user needs to use may be independently stored in different locations including the computer device or a server in a local area network (LAN) or a wide area network (WAN) such as the Internet.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Advantageously, the present invention discloses an electronic device that allows a user to quickly obtain meanings and translations of words from electronic dictionaries while reading a text on a display screen of the electronic device. Specifically, the meanings and translations may be displayed in a balloon, in a pop-up window, as subscript, as superscript, or in any other suitable manner when the user touches a word on the display screen, which is a touch screen in one embodiment.

Figure 1:
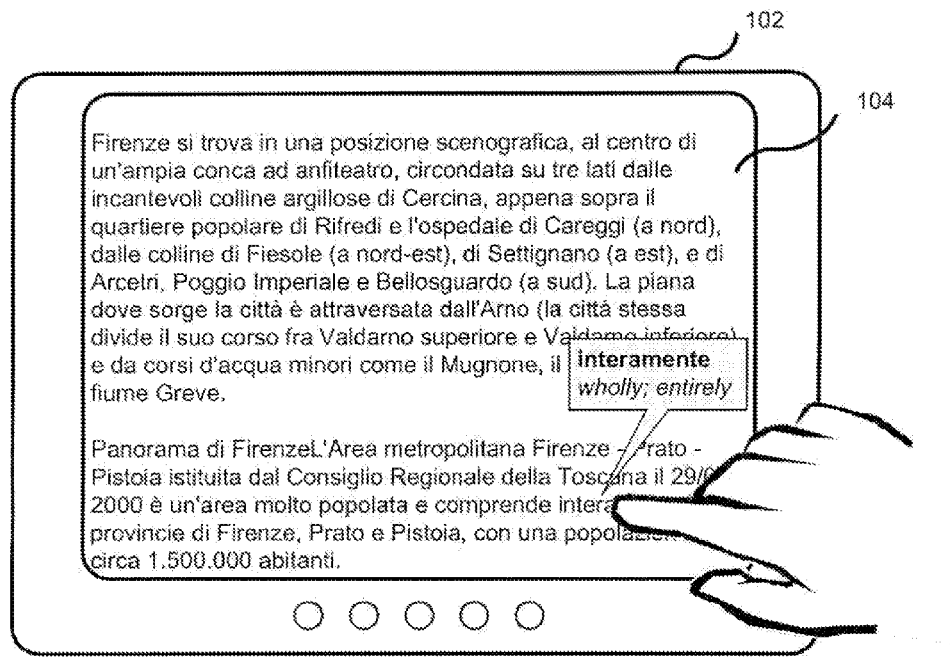
FIG. 1 shows an example of displaying a dictionary entry of a word touched by a user on a touch screen of an electronic device, in accordance with an embodiment of the present disclosure.

Referring now to FIG. 1 of the drawings, there is an example of an electronic device 102, comprising a display screen 104, which is a touch screen in one embodiment. The content presented on the display touch screen 104 may be outputted by any application (e.g. Word, Notepad, Adobe, dedicated e-book reader, a Web Browser, any image viewer, etc.) that sends images or text to the display screen 104. When the user touches an area on the display screen 104 with a finger, a stylus or with any other suitable object and there is a word or word combination in the area, a balloon appears displaying an abridged version of the relevant dictionary entry.

Figure 3:
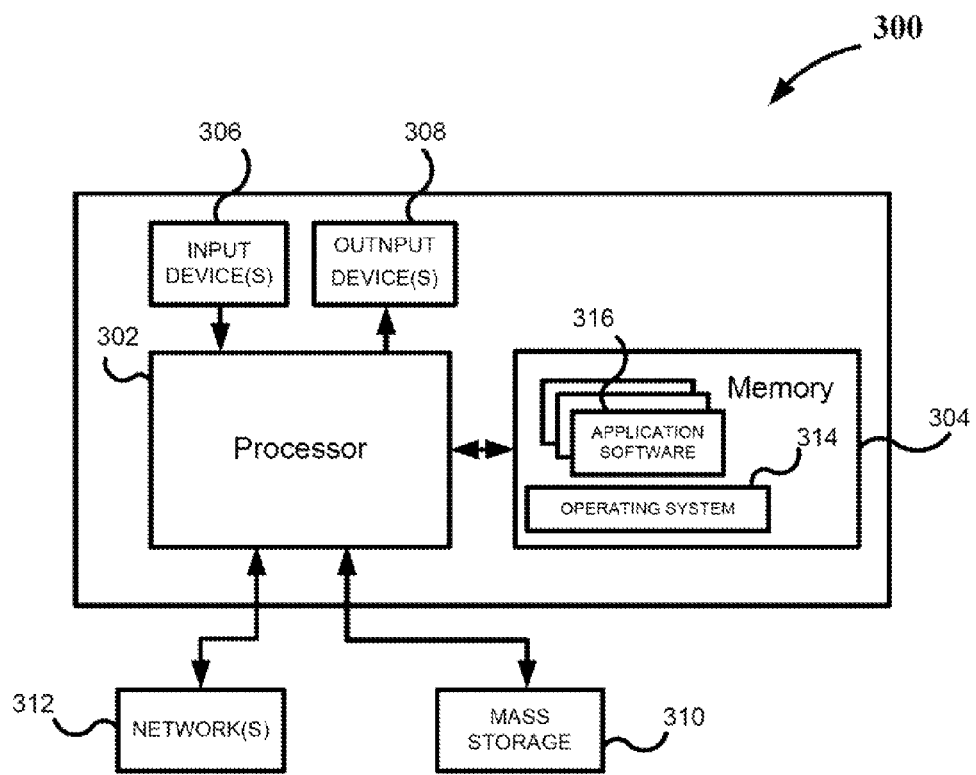
FIG. 3 shows exemplary hardware for implementing the user's electronic device, in accordance with an embodiment of the present disclosure.

The electronic device 102 may comprise a general purpose computer embodied in different configurations such as a desktop personal computer (PC), laptop computer, smartphone, cell phone, digital camera, or any other gadget and having touch screen as a display screen. FIG. 3 of the drawings shows exemplary hardware for implementing the user electronic device 102, in accordance with one embodiment.

The electronic device 102 may be provisioned with software that includes a client dictionary application to implement techniques disclosed herein. The application may include one or more local dictionaries. Additionally, the application may be able to access one or more remote dictionaries located on a remote server via network connection to the server.

To look up words and word combinations that appear in non-text files, for example in JPG, TIFF or PDF files, the user's electronic device may include additional Optical Character Recognition (OCR) software which identifies the region on the image where the word or word combination is located and then converts the image in the region into a text format.

Figure 2:
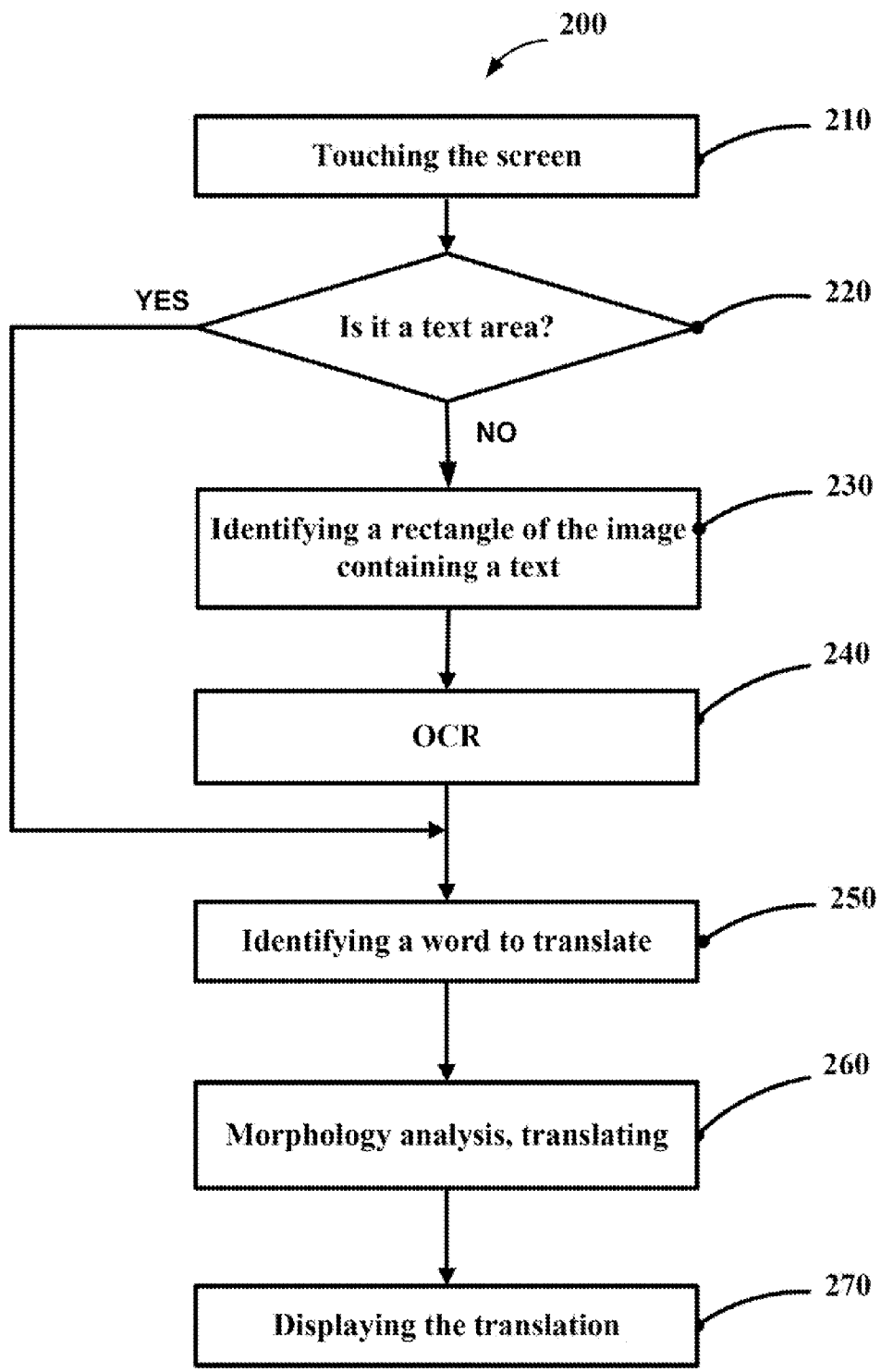
FIG. 2 shows a flowchart of operations performed by a dictionary software, in accordance with an embodiment of the present disclosure.

Referring now to FIG. 2 of the drawings, there is shown a flowchart of operations performed by the application, in accordance with one embodiment of the invention. When the user reads a text on the display screen 104 of the electronic device 102 and wishes to look up a word or word combination, the user simply points to the word or word combination with a mouse cursor or touches the corresponding region on the display screen 104 with a finger, a stylus or any other suitable object.

The touch 210 initiates a process that enables the user to see an abridged dictionary entry for the word or the word combination. Next, the electronic device 102 takes advantage of the touch screen's ability to establish the coordinates of a touch matches these coordinates against the image on the screen. In one embodiment, when the touch screen senses the touching of the screen 104, e.g. by finger, touch coordinate information corresponding to the touching is conveyed to the software application via the operating system. Techniques which can determine coordinates corresponding to the touching may be very different depending on the type of the touch screen which may be resistive, matrix, capacitive, based on surface acoustic waves, infrared, optical imaging, based on dispersive signal technology or acoustic pulse recognition etc. In another embodiment the touch screen may have a program interface, and the software application may receive coordinates corresponding to the touching directly from the touch screen through the program interface.

After receiving the coordinates, the software application determines whether the corresponding point is in a text area (220). If the coordinates point to a text area, the word region is identified (250). A word region may contain one word or a word combination. The identified word or word combination is then passed as a query to the dictionary.

If the coordinates point to a non-text area (e.g. PDF, TPG, TIF, etc.), an OCR software is applied. At the step 230, the OCR software identifies a rectangular region that contains text. To speed up OCR, the OCR software may identify a smallest rectangular image that contains an image of only one word or a word string being touched by the user.

At the step 240, the OCR software is applied to the identified rectangular region. The result of the OCR is a word or word combination represented by a string of characters. At the OCR step, morphology dictionaries may also be used, as higher OCR accuracy and error correction is often achieved by comparing the recognition results with similar word forms in the morphology dictionary. Then the word region and the corresponding word query are identified at 250.

At the step 260, the query is passed to the dictionary or a set of dictionaries preliminarily selected by a user in the same way as when the user enters a search string in a dedicated look-up field. Additionally, as the electronic dictionary includes a morphology module, the query word or word combination need not be in the base, or "dictionary," form—the morphology module identifies the base form of any inflected form. If more than one base forms are possible, the morphology module identifies all the possible variants.

Thus, at the step 260, the morphology of the selected word is analyzed. The morphology analysis returns a set of possible base, or "dictionary," forms of the word. For the obtained base forms, dictionary meanings/translations are retrieved. If the entry is to be shown in a pop-up window, as subscript or if the screen has a small size as in the case of a mobile device, the most likely (frequent) translation or the translation of the most likely (frequent) part of speech may be selected. Finally, at the step 270, the meaning/translation is displayed on the display screen 104 of the electronic device 102. The translation may be displayed in a balloon, in a pop-up window, as a subscript, or in any other suitable manner.

In another embodiment of the invention, the electronic device 102 may access not only a bilingual dictionary, but also a monolingual dictionary with definitions, etc., or any other reference book, a travel guide, etc. In still another embodiment of the invention, additionally the recorded or audio pronunciation of the identified and recognized word and/or its translation may be played back, for example by selecting it preliminarily or also by touch, which is of value to language learners. Translations may also be obtained from a remote server. The remote server may be accessible via a data path that includes a wireless data path.

Although, in the above embodiments user input was based on finger touches, it is to be understood that in other embodiments, other user input methods based on haptic input methods in general, or other pointing methods, e.g. pen/stylus based methods may be used.

The electronic devices of the present invention may include any electronic device that has a touch screen as a display screen and application programs to display text or text image on the display screen. As such, the electronic devices may include a mobile phone, a smartphone, a digital camera, a dedicated reading device or e-book reader, a PC, a notebook computer, a tablet PC, etc. There are a variety of touch screen technologies. The touch screen may be resistive, matrix, capacitive, based on surface acoustic waves, infrared, optical imaging, based on dispersive signal technology or acoustic pulse recognition etc.

FIG. 3 of the drawings shows hardware 300 that may be used to implement the user electronic device 102 in accordance with one embodiment of the invention in order to translate a word or word combination and to display the found translations to the user. Referring to FIG. 3, the hardware 300 typically includes at least one processor 302 coupled to a memory 304 and having touch screen among output devices 308 which in this case is serves also as an input device 306. The processor 302 may be any commercially available CPU. The processor 302 may represent one or more processors (e.g. microprocessors), and the memory 304 may represent random access memory (RAM) devices comprising a main storage of the hardware 300, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 300, e.g. any cache memory in the processor 302 as well as any storage capacity used as a virtual memory, e.g., as stored on a mass storage device 310.

The hardware 300 also typically receives a number of inputs and outputs for communicating information externally. For interface with a user or operator, the hardware 300 usually includes one or more user input devices 306 (e.g., a keyboard, a mouse, imaging device, scanner, etc.) and a one or more output devices 308 (e.g., a Liquid Crystal Display (LCD) panel, a sound playback device (speaker). To embody the present invention, the hardware 300 must include at least one touch screen device (for example, a touch screen), an interactive whiteboard or any other device which allows the user to interact with a computer by touching areas on the screen. The keyboard is not obligatory in case of embodiment of the present invention.

For additional storage, the hardware 300 may also include one or more mass storage devices 310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 300 may include an interface with one or more networks 312 (e.g., a local area network (LAN), a wide area network (WAN), a wireless network, and/or the Internet among others) to permit the communication of information with other computers coupled to the networks. It should be appreciated that the hardware 300 typically includes suitable analog and/or digital interfaces between the processor 302 and each of the components 304, 306, 308, and 312 as is well known in the art.

The hardware 300 operates under the control of an operating system 314, and executes various computer software applications 316, components, programs, objects, modules, etc. to implement the techniques described above. In particular, the computer software applications will include the client dictionary application and also other installed applications for displaying text and/or text image content such a word processor, dedicated e-book reader etc. in the case of the client user device 102. Moreover, various applications, components, programs, objects, etc., collectively indicated by reference 316 in FIG. 3, may also execute on one or more processors in another computer coupled to the hardware 300 via a network 312, e.g. In a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A computer implemented method comprising:
displaying text image content on a display screen;
detecting user input associated with a portion of the display screen;
establishing coordinates associated with the user input;
identifying a rectangular region of the text image content indicated by the coordinates, wherein the rectangular region contains text;
performing character recognition on the identified rectangular region to extract text from the text image content resulting in a recognition result;
comparing the recognition result with similar word forms in a first morphology dictionary to correct errors in the recognition result;
identifying the extracted text associated with the rectangular region of the text image content;
determining a set of base forms of any inflected form of the word in the extracted text using a second morphological dictionary;
performing a dictionary lookup based on the identified extracted text comprising:
determining a set of base forms of any inflected form of a word in the extracted text using a second morphological dictionary;
identifying a set of translations of the set of base forms from a first dictionary;
determining a result translation of the word from the retrieved set of translations, wherein the result translation is a most likely part of speech;
and displaying the result translation of the dictionary lookup on the display screen.

2. The method of claim 1, wherein the user input comprises one of pointer-based or haptic-based input.

3. The method of claim 2, wherein the haptic-based input comprises touch-based inputs.

4. The method of claim 2, wherein the pointer-based input comprises pen-based inputs.

5. The method of claim 1, wherein performing the dictionary lookup further comprises:
generating a word query comprising at least one word based on the recognition result; and
passing the word query to at least first dictionary.

6. The method of claim 5, wherein the generating the word query comprises:
performing morphological analysis to identify a base form of each word in the word query.

7. The method of claim 1, wherein identifying the text comprises selecting at least one word from a text area of the content indicated by the coordinates.

8. The method of claim 1, wherein identifying the rectangular region includes identifying a smallest rectangular region of the text image content indicated by the coordinates and which contains at least a portion of a word.

9. The method of claim 1, wherein performing the text recognition operation comprises applying an optical character recognition technique to the identified rectangular region to form a recognition result comprising at least one word.

10. The method of claim 1, wherein the displaying comprises displaying at least a most likely result of the dictionary lookup.

11. The method of claim 1, wherein the displaying comprises displaying the result of the dictionary lookup in the form of one of a pop-up window, superscript text, subscript text, and a text balloon.

12. The method of claim 1, wherein performing the dictionary lookup comprises accessing at least one dictionary selected from the group consisting of a local dictionary and a remote dictionary.

13. The method of claim 1, further comprising playing back an audio pronunciation associated with the result of the dictionary lookup.

14. An electronic device comprising:
  a processor; and
  a memory coupled to the processor, the memory storing instructions which when executed by the processor cause the processor to perform operations comprising:
    displaying text image content on a display screen;
    detecting user input associated with a portion of the display screen;
    establishing coordinates associated with the user input;
    identifying a rectangular region of the text image content indicated by the coordinates, wherein the rectangular region contains text;
    performing character recognition on the identified rectangular region to extract text from the text image content resulting in a recognition result;
    comparing the recognition result with similar word forms in a first morphology dictionary to correct errors in the recognition result;
    identifying the extracted text associated with the rectangular region of the text image content;
    determining a set of base forms of any inflected form of the word in the extracted text using a second morphological dictionary;
    performing a dictionary lookup based on the identified extracted text comprising:
      determining a set of base forms of any inflected form of a word in the extracted text using a second morphological dictionary;
      identifying a set of translations of the set of base forms from a first dictionary;
      determining a result translation of the word from the retrieved set of translations, wherein the result translation is a most likely part of speech; and
    displaying the result translation of the dictionary lookup on the display screen.

15. The electronic device of claim 14, wherein the user input comprises one of pointer-based or haptic-based input.

16. The electronic device of claim 15, wherein the haptic-based input comprises touch-based inputs.

17. The electronic device of claim 15, wherein the pointer-based input comprises pen-based inputs.

18. The electronic device of claim 14, wherein performing the dictionary lookup further comprises generating a word query comprising at least one word based on the recognition result and passing the word query to at least the first dictionary.

19. The electronic device of claim 18, wherein the generating the word query comprises performing morphological analysis to identify a base form of each word in the word query.

20. The electronic device of claim 14, wherein identifying the text includes selecting at least one word from a text area of the text image content indicated by the coordinates.

21. The electronic device of claim 14, wherein identifying the rectangular region comprise identifying a smallest rectangular region of the text image content indicated by the coordinates and which contains at least a portion of a word.

22. The electronic device of claim 14, wherein the displaying comprises displaying at least a most likely result of the dictionary lookup.

23. The electronic device of claim 14, wherein the displaying comprises displaying the result of the dictionary lookup in the form of one of a pop-up window, superscript text, subscript text, and a text balloon.

24. The electronic device of claim 14, wherein performing the dictionary lookup comprises accessing at least one dictionary selected from the group consisting of a local dictionary and a remote dictionary.

25. The electronic device of claim 14, wherein the method further comprises playing back an audio pronunciation associated with the result of the dictionary lookup.

26. A non-transitory computer-readable medium having stored thereon a sequence of instruction which when executed by a system cause the system to perform a method, comprising:
  displaying text image content on a display screen;
  detecting user input associated with a portion of the display screen;
  establishing coordinates associated with the user input;
  identifying a rectangular region of the text image content indicated by the coordinates, wherein the rectangular region contains text;
  performing character recognition on the identified rectangular region to extract text from the text image content resulting in a recognition result;
  comparing the recognition result with similar word forms in a first morphology dictionary to correct errors in the recognition result;
  identifying the extracted text associated with the rectangular region of the text image content;
  determining a set of base forms of any inflected form of the word in the extracted text using a second morphological dictionary;
  performing a dictionary lookup based on the identified extracted text comprising:
    determining a set of base forms of any inflected form of a word in the extracted text using a second morphological dictionary;
    identifying a set of translations of the set of base forms from a first dictionary;
    determining a result translation of the word from the retrieved set of translations, wherein the result translation is a most likely part of speech; and
  displaying the result translation of the dictionary lookup on the display screen.

27. The non-transitory computer-readable medium of claim 26, wherein identifying the extracted text associated with the rectangular region of the text image content includes selecting at least one word from a text area of the content indicated by the coordinates.

* * * * *